United States Patent
Kimura et al.

(10) Patent No.: US 7,206,151 B2
(45) Date of Patent: Apr. 17, 2007

(54) SYSTEM, METHOD AND COMPUTER PROGRAM PRODUCT FOR TAPE FAILURE DETECTION

(75) Inventors: Tomoaki Kimura, Fujisawa (JP); Noriko Yamamoto, Kawasaki (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/858,031

(22) Filed: Jun. 1, 2004

(65) Prior Publication Data
US 2004/0264023 A1   Dec. 30, 2004

(30) Foreign Application Priority Data
May 30, 2003   (JP)   ............................. 2003-153823

(51) Int. Cl.
*G11B 5/09*   (2006.01)
(52) U.S. Cl. ....................................................... 360/53
(58) Field of Classification Search ................... None
See application file for complete search history.

(56) References Cited

U.S. PATENT DOCUMENTS

| | | | | |
|---|---|---|---|---|
| 4,637,023 A | * | 1/1987 | Lounsbury et al. ........... 360/53 |
| 5,872,672 A | * | 2/1999 | Chliwnyj et al. ........ 360/77.12 |
| 5,995,306 A | * | 11/1999 | Contreras et al. ............. 360/31 |
| 6,034,831 A | * | 3/2000 | Dobbek et al. ............... 360/53 |
| 6,512,644 B1 | * | 1/2003 | Hall et al. .................... 360/31 |

* cited by examiner

Primary Examiner—Andrea Wellington
Assistant Examiner—Glenda P. Rodriguez
(74) Attorney, Agent, or Firm—John C. Kennel; Dillon & Yudell LLP

(57) ABSTRACT

A tape recording apparatus for recording data on a tape medium is provided with: a data writing unit for writing a data unit to the tape medium, and if an error is detected in the writing of the data unit, writing the same data unit to the tape medium again and recording a plurality of the data units sequentially; a write number counter for, in a data set including the plurality of data units, counting a write number which is a number of writing the data units; a write number information storage unit for storing write number information, in which information indicating the counted write number and a physical position in the tape medium are associated with each other, with respect to a plurality of the tape media to which the above described tape recording apparatus has written; and a failure determination unit for detecting a failure in the data writing unit based on the write number information.

20 Claims, 6 Drawing Sheets

[Figure 1]
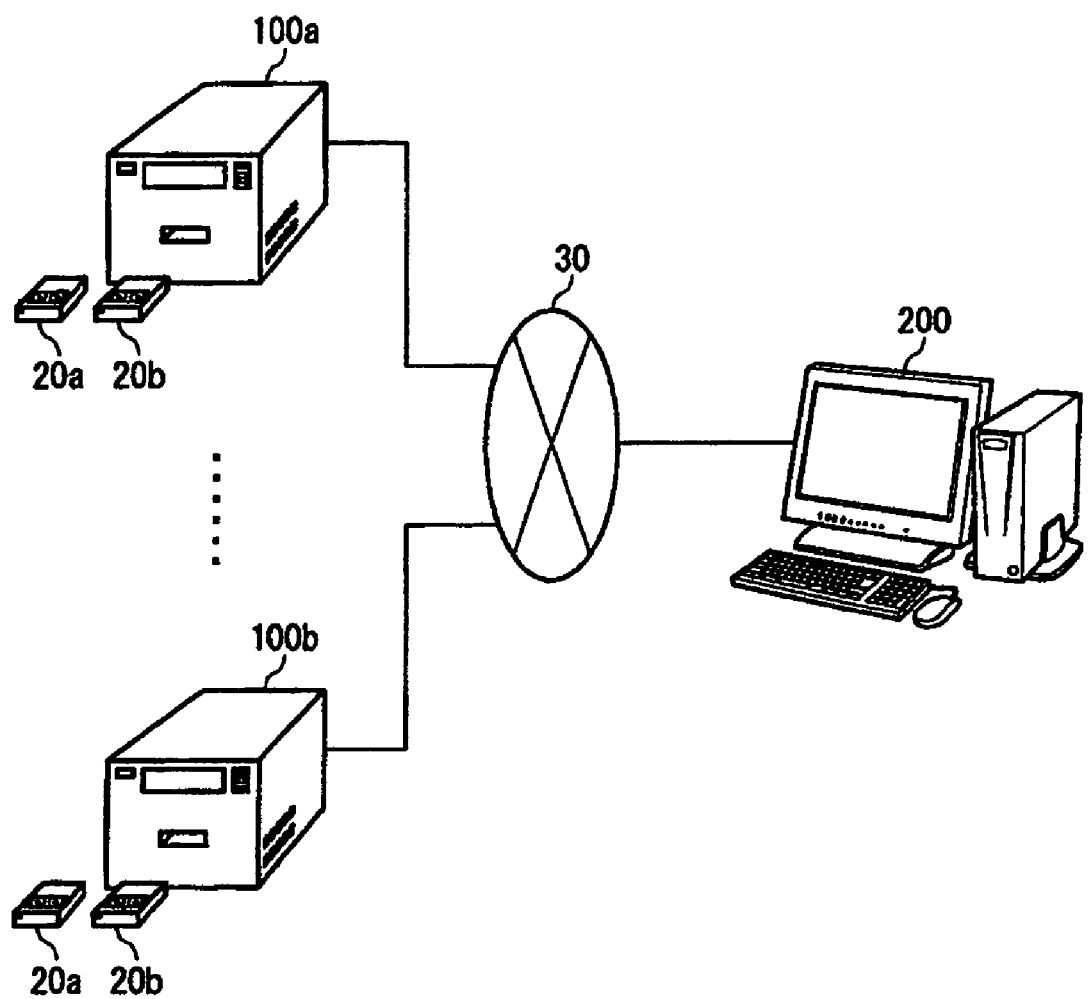

[Figure 2]
(a)
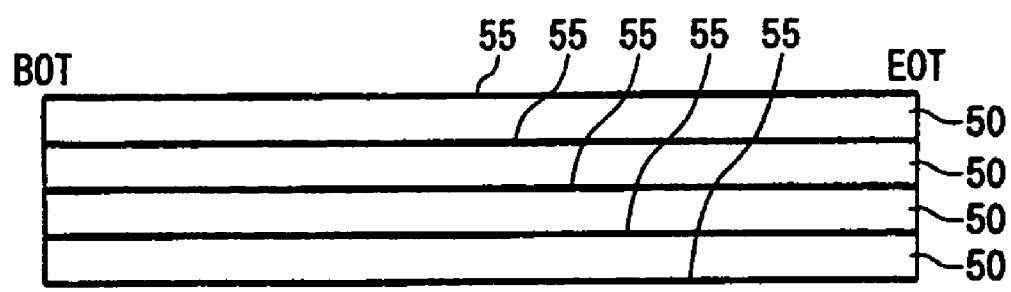
(b)
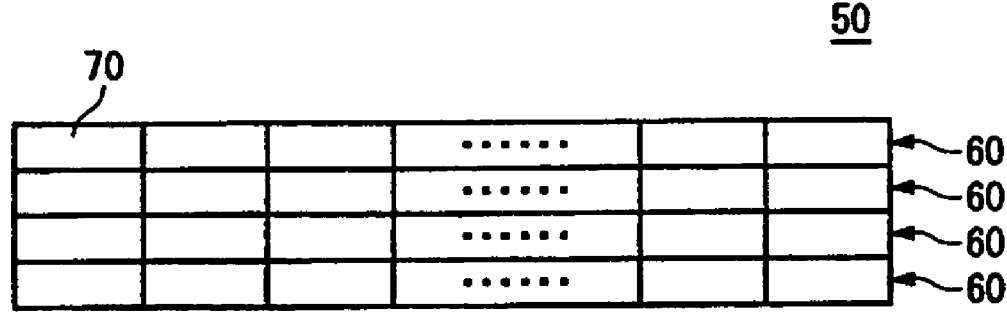

[Figure 3]
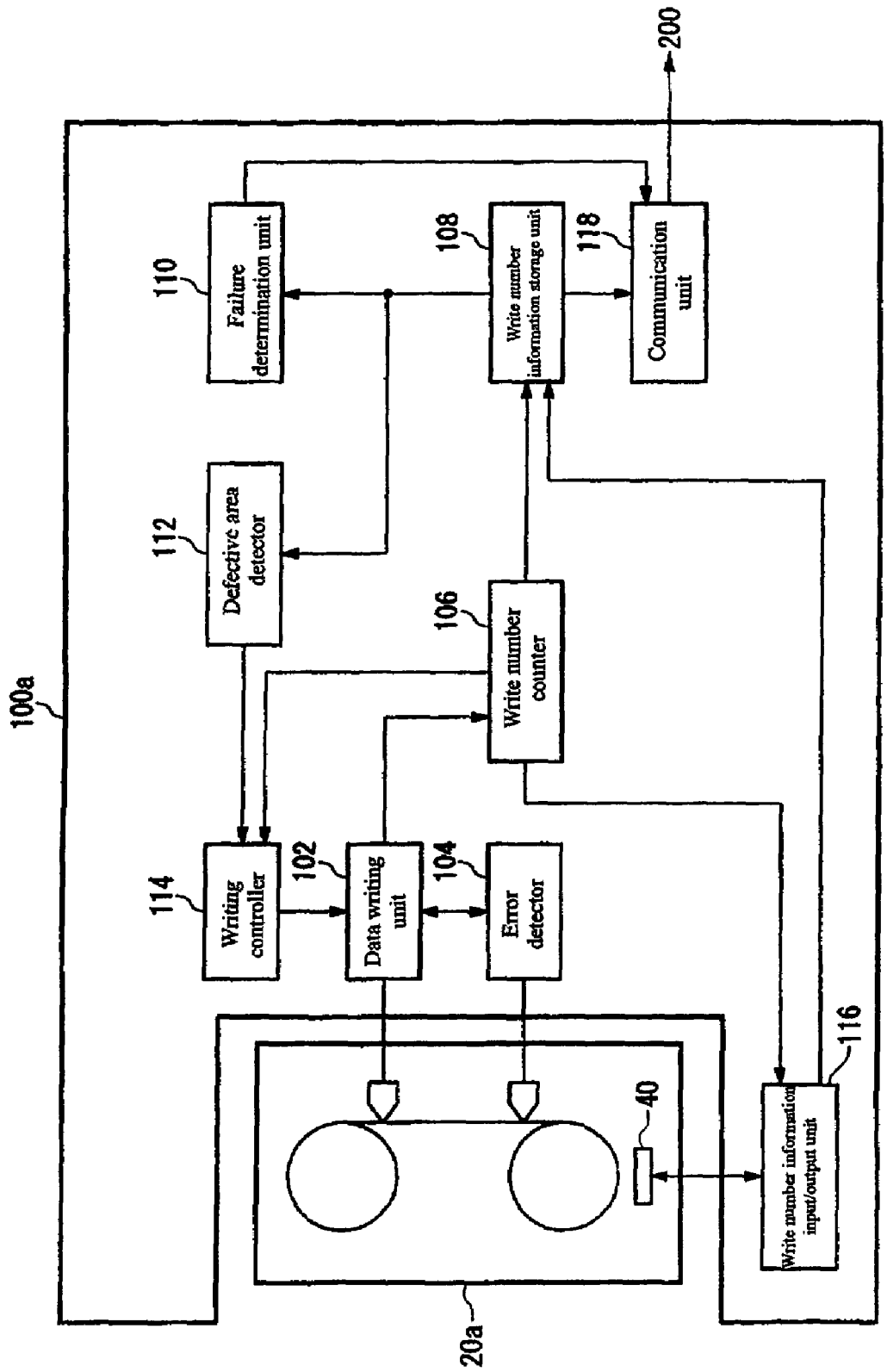

[Figure 4]
(a)
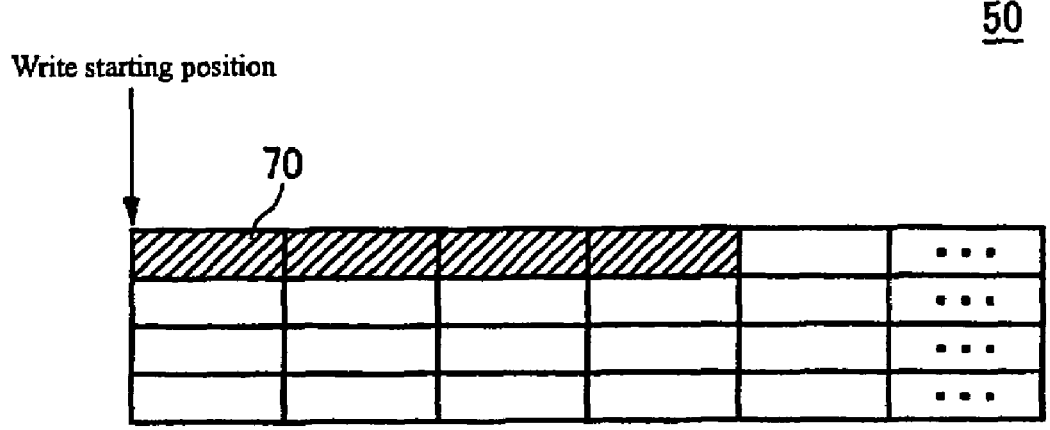
(b)
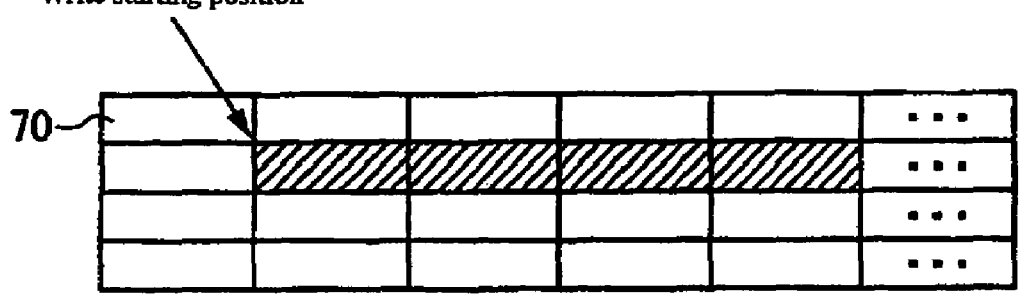

[Figure 5]
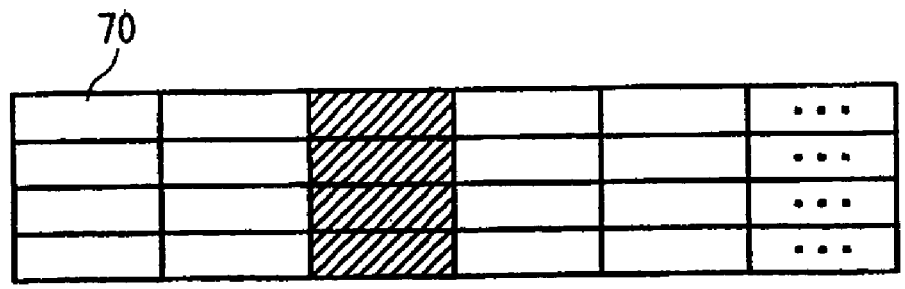
[Figure 6]
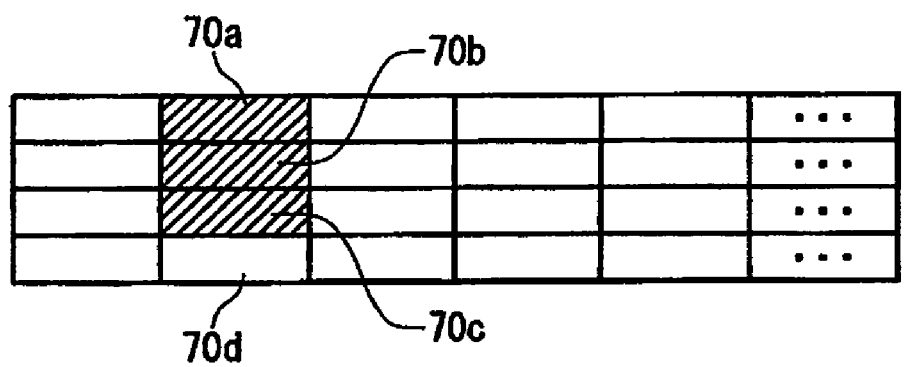
[Figure 7]
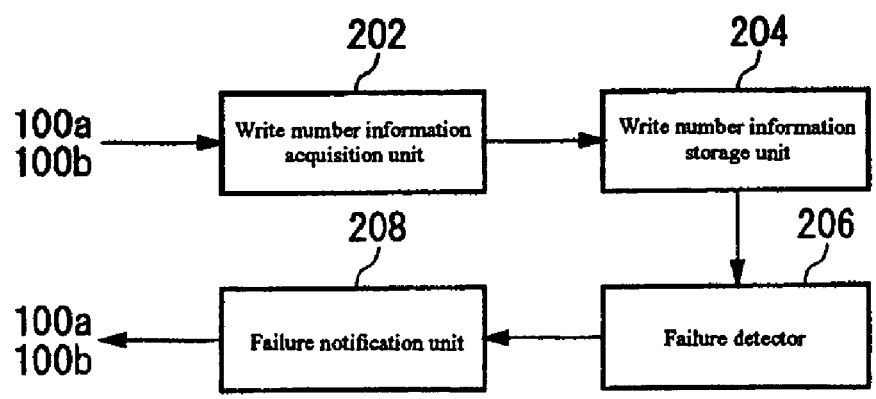

[Figure 8]
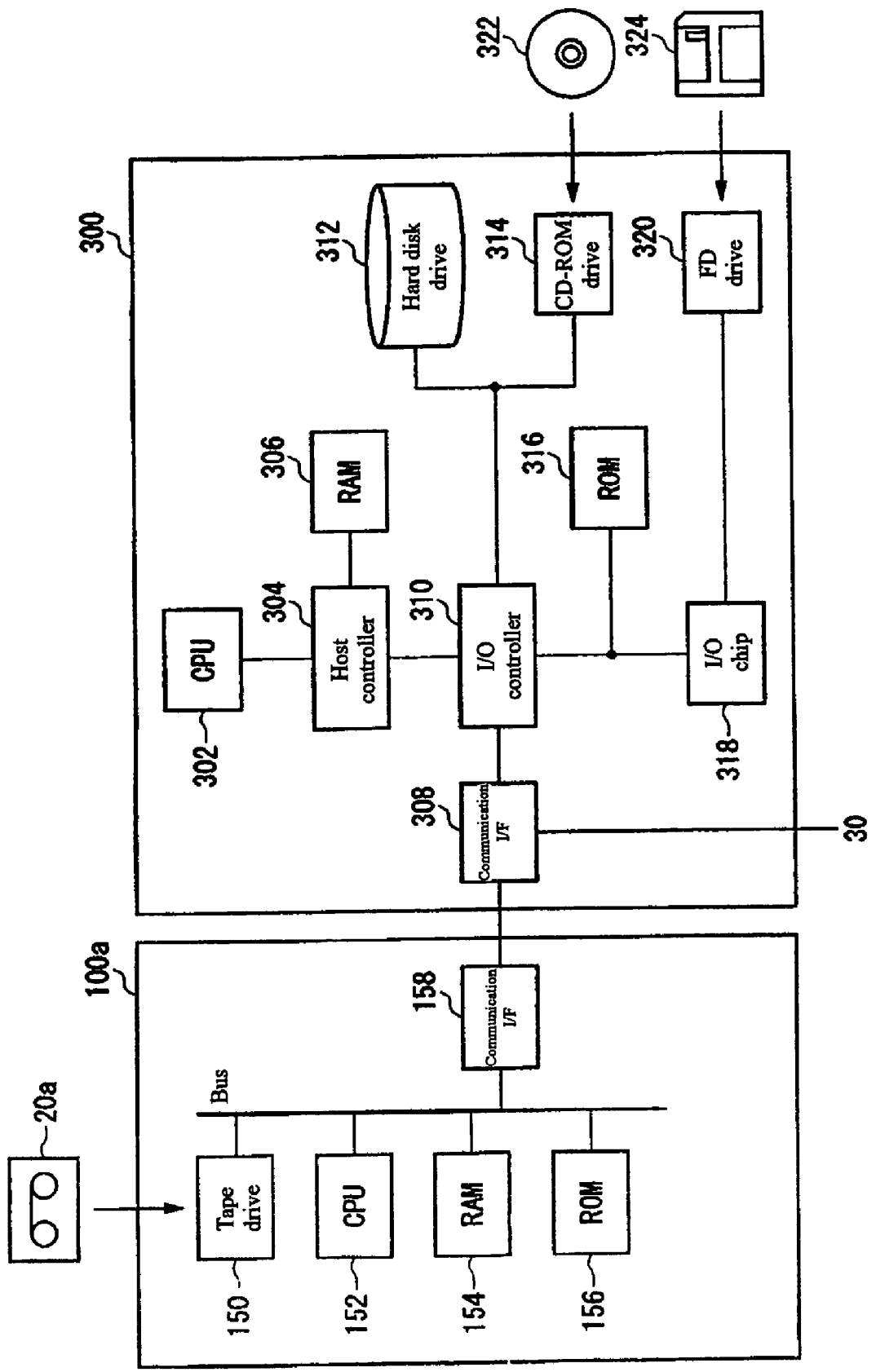

US 7,206,151 B2

SYSTEM, METHOD AND COMPUTER PROGRAM PRODUCT FOR TAPE FAILURE DETECTION

This present application claims priority to the subject matter of Japanese Patent Application No. JP2003-153823, Filed May 30, 2003; entitled "Tape Recording Apparatus, Tape Failure Detection Method, Program and Recording Medium". The content of the above-referenced application is incorporated herein.

BACKGROUND OF THE INVENTION

1. Technical Field

The present invention relates to a system, method and computer program product in a computer-readable medium for detecting a tape failure. More particularly, the present invention relates to an apparatus for detecting a failure in a tape recording apparatus or a failure in a tape medium.

2. Description of the Related Art

In a conventional tape recording apparatus, a failure in a reading head is detected by measuring an impedance of the reading head for data in POST (Power On Self Test). In addition, a failure in a writing head is detected by reading and verifying the data written in the tape medium. It should be noted that a method for preventing loss of the due to a defect in a tape medium and a method for reporting that recording or reply of data was not executed due to dust attached on the writing head or the reading head have been proposed. For example, see Published Japanese Examined Patent Application No. 58-58727 and Published Unexamined Patent Application No. 61-71471.

Because conventional methods for detecting a failure in the writing head only reads and verifies the data written in the tape medium, no method has existed for determining whether a failure resides in the tape medium or in the writing head.

Therefore, it is an object of the present invention to provide a system, method and computer program product in a computer-readable medium for a tape failure detection method.

SUMMARY OF THE INVENTION

In a preferred embodiment, a tape recording apparatus is provided with a data writing unit for writing a data unit to a tape medium, and if an error is detected in the writing of the data unit, writing the same data unit to the tape medium again and recording a plurality of data units sequentially. A write number counter is also included for, in a data set including the plurality of data units, counting a write number, which is a number of write operations by the data writing unit. A write number information storage unit for storing write number information, in which information indicating the write number counted by the write number counter and a physical position in the tape medium of a block including a plurality of the data sets are associated with each other, with respect to a plurality of the tape media to which the above described tape recording apparatus has written is also included, as is a failure determination unit for determining that there is a failure in the data writing unit, if multiple members of a plurality of the write number information, with respect to a plurality of tape media, indicates that the blocks, including the data set, in which the write number is larger than a predetermined number, are successive from a write starting position in each of the plurality of tape media, along a longitudinal direction of each of the tape media.

In addition, the tape recording apparatus may be further provided with a defective area detector for detecting a defective area of a tape of the tape medium based on the write number information stored in the write number information storage unit and a writing controller for prohibiting the writing by the data writing unit into the defective area detected by the defective area detector, and controlling the data writing unit to write in the other area than the defective area.

Moreover, the writing controller may, if the write number counted by the write number counter reaches a set number, cause the writing by the data writing unit to stop, and may cause the data writing unit to write the data set again in a different area from an area where the data set has been written in the tape medium. The failure determination unit may determine that there is the failure in the data writing unit, if the write number counted by the write number counter reaches the set number, in the data set written by the data writing unit again.

BRIEF DESCRIPTION OF THE DRAWINGS

FIG. 1 shows an example of a configuration of a tape failure detection system;

FIG. 2 shows an example of a configuration of a recording area in a tape medium;

FIG. 3 shows an example of a functional configuration of a tape recording apparatus;

FIG. 4 shows an example of a failure determination method by means of a failure determination unit;

FIG. 5 shows an example of the failure determination method by means of the failure determination unit;

FIG. 6 shows an example of a defective area detection method by means of a defective area detector;

FIG. 7 shows an example of a functional configuration of a tape failure detection apparatus; and FIG. 8 shows an example of a hardware configuration of the tape recording apparatus and an information processing apparatus.

DETAILED DESCRIPTION OF THE PREFERRED EMBODIMENT

Though the present invention will be described below with respect to a preferred embodiment of the invention, the following embodiment does not limit the invention according to the claims, and all combinations of characteristics described in the embodiment are not necessarily essential for a solution of the invention.

FIG. 1 shows an example of a configuration of a tape failure detection system 10 according to an embodiment of the present invention. The tape failure detection system 10 will, based on information indicating a write error in a plurality of tape media 20a and 20b caused by one tape recording apparatus 100a, or information indicating a write error in one tape medium 20a due to a plurality of tape recording apparatus 100a and 100b, separate a failure in the tape recording apparatus 100a from the failure in the tape medium 20a, and correctly identify a failure point causing the write error.

The tape failure detection system 10 is provided with a plurality of the tape recording apparatus 100a and 100b for recording data to the tape medium 20a or 20b, and a tape failure detection apparatus 200 connected to a plurality of the tape recording apparatus 100a and 100b. The tape recording apparatus 100a and 100b and the tape failure detection apparatus 200 are connected via a network 30 such as a SCSI interface, LAN (Local Area Network) or similar means. In addition, the tape recording apparatus 100a and 100b and the tape failure detection apparatus 200 may be connected via the network 30 such as a leased line, the Internet or similar means. It should be noted that the tape recording apparatus 100a and 100b may be connected to an information processing apparatus such as a personal computer and the like via a communication interface such as the SCSI interface, the LAN or similar means, and may be connected to the network 30 via the information processing apparatus.

The tape recording apparatus 100a and 100b are, for example, tape recording apparatus designed according to the LTO (Linear Tape Open) standard, and the tape media 20a and 20b are, for example, tape media designed according to the LTO standard. It should be noted that the LTO standard is a standard of an open format which was developed collaboratively by Hewlett-Packard Corporation, IBM Corporation and Seagate Corporation.

The tape recording apparatus 100a records the data to the tape media 20a and 20b, and detects a write error in the above-described recording. Then the tape recording apparatus 100a associates the information indicating the detection of the write error when the data was recorded to the tape medium 20a, with tape medium identification information which is information for identifying the tape medium 20a, and holds it. The tape recording apparatus 100a also associates the information indicating the write error detected when the data was recorded to the tape medium 20b, with the tape medium identification information, which is information for identifying the tape medium 20b, and holds it. Then tape recording apparatus 100a detects the failure in the tape recording apparatus 100a based on information indicating the write error. In addition, the tape recording apparatus 100a may also associate the information indicating the write error detected when the data was recorded to the tape medium 20a, with tape recording apparatus identification information which is information for identifying the tape recording apparatus 100a, and may hold it in a cartridge memory provided in the tape medium 20a.

The tape recording apparatus 100b records the data to the tape media 20a, and detects the write error in the above described recording. Then the tape recording apparatus 100b associates the information indicating the write error detected when the data was recorded to the tape medium 20a, with the tape medium identification information which is the information for identifying the tape medium 20a, and holds it. In addition, the tape recording apparatus 100b also reads the information indicating the write error detected when the tape recording apparatus 100a recorded the data to the tape medium 20a, from the cartridge memory provided in the tape medium 20a. Then the tape recording apparatus 100b detects the failure in the tape medium 20a, based on information indicating the write error detected when the tape recording apparatus 100a recorded the data to the tape medium 20a, and the information indicating the write error detected when the tape recording apparatus 100b recorded the data to the tape medium 20a.

The tape failure detection apparatus 200 associates and acquires the information indicating the write error detected when the tape recording apparatus 100a or 100b recorded the data to the tape medium 20a or 20b, the tape recording apparatus identification information on the tape recording apparatus 100a or 100b which wrote the data, and the tape medium identification information on the tape medium 20a or 20b to which the data was written, from the tape recording apparatus 100a or 100b via the network 30. Then the tape failure detection apparatus 200 detects the failure in the tape recording apparatus 100a and 100b as well as the tape media 20a and 20b, based on the plurality of information indicating the write error, acquired from the tape recording apparatus 100a or 100b.

As described above, it is possible to separate correctly the failure due to a fault of a writing head of the tape recording apparatus 100a or 100b, from the failure due to the fault of the tape of the tape medium 20a or 20b, by analyzing statistically the write error of the data written by the plurality of tape recording apparatus 100a and 100b, or the write error of the data written to the plurality of tape media 20a and 20b, by the tape recording apparatus 100a or 100b or the tape failure detection apparatus 200.

FIG. 2 shows an example of a configuration of a recording area on the tape medium 20a according to this embodiment. The tape medium 20a as shown in FIG. 2(a), includes a plurality of bands 50 arranged from BOT (Beginning Of Tape) to EOT (End Of Tape) along a longitudinal direction of the tape medium 20a. On both ends of each of the plurality of bands 50, servo tracks 55 are provided along the longitudinal direction, for controlling a write position for the data.

The band 50 as shown in FIG. 2(b) includes a plurality of data tracks 60 arranged along the longitudinal direction of the tape medium 20a. The width in the data track 60 in a transverse direction of the tape medium 20a is the width in which the data may be written at a time by the tape recording apparatus 100a. The data track 60 includes a plurality of blocks 70 along the longitudinal direction of the tape medium 20a. The block 70 includes a plurality of data sets, and the data set includes a plurality of CQs (Codeword Quads), which is an example of a data unit, which is a write unit of the data. For example, if all of the CQs have been written normally, the data set consists of 64 CQs.

FIG. 3 shows an example of a functional configuration of the tape recording apparatus 100a according to this embodiment. The tape recording apparatus 100a includes a data writing unit 102 for writing the data to the tape medium 20a, an error detector 104 for detecting the error of the data written to the tape medium 20a by the data writing unit 102, a write number counter 106 for counting a number of writing the data to the tape medium 20a by the tape writing unit 102; a write number information storage unit 108 for storing information indicating the write number counted by the write number counter 106, and a failure determination unit 110 for determining whether there is the failure in the data writing unit 102, based on the write number information stored in the write number information storage unit 108.

In addition, the tape recording apparatus 100a includes a defective area detector 112 for detecting a defective area of the tape of the tape medium 20a based on the write number information stored in the write number information storage unit 108, and a writing controller 114 for controlling the writing the data by the data writing unit 102, based on a result of the detection by the defective area detector 112, a write number information input/output unit 116 for reading or writing the write number information to a cartridge memory 40 which the tape medium 20a has, and a communication unit 118 for communicating with the tape failure detection-apparatus 200 via the network 30. It should be noted that the cartridge memory 40 is a nonvolatile recording medium, for example, such as a flash memory, a SRAM or similar device.

The data writing unit 102 writes the CQs to the tape medium 20a, and records the plurality of CQs sequentially. Then the data writing unit 102 sends a state of the data recording (information indicating whether the recording has succeeded or not, information indicating whether the data to be written has been completed or not, and the like) to the error detector 104. When the error detector 104 receives the state of the data recording from the data writing unit 102, it determines whether the write error has occurred in the writing of the CQs by the data writing unit 102. Then if the error detector 104 detects the write error, the data writing unit 102 writes the same CQ as the CQ in which the write error has been detected, to the tape medium 20a again. In this way, until the CQ is written to the tape medium 20a normally, the data writing unit 102 executes a similar operation repeatedly.

The write number counter 106 counts, in the data set including the plurality of CQs, the write number which is a number of writing the CQs by the data writing unit 102, for each data set. Then the write number counter 106 sends the information indicating the counted write number to the write number information storage unit 108. In addition, the write number counter 106 may send the information indicating the counted write number to the write number information input/output unit 116. Then the write number information input/output unit 116 writes the information indicating the write number counted by the write number counter 106, to the cartridge memory 40, along with the tape recording apparatus identification information on the tape recording apparatus 100a and a physical position in the tape medium 20a where the data set has been written.

The write number information storage unit 108 stores the write number information, in which the information indicating the write number counted by the write number counter 106 and the physical position in the tape medium 20a where the data set has been written are associated with each other. The physical position in the tape medium 20a where the data set has been written is, for example, the physical position in the tape medium 20a of the block 70, and the write number information storage unit 108 associates the information indicating the write number counted by the write number counter 106, with block identification information for identifying the block 70, and stores it. The write number information storage unit 108 further associates the information indicating the write number counted by the write number counter 106, with the tape medium identification information on the tape medium 20a, and stores it.

In addition, the write number information storage unit 108 similarly stores the write number information with respect to the tape medium 20b to which the tape recording apparatus 100a has written the data with the data writing unit 102. Moreover, the write number information storage unit 108 may associate the write number information which the write number information input/output unit 116 has read from the cartridge memory 40 of the tape medium 20a or 20b, with the tape medium identification information on the tape medium 20a or 20b, and store it. In other words, the write number information storage unit 108 stores the write number information with respect to the plurality of tape media 20a and 20b to which the tape recording apparatus 100a has written the data with the data writing unit 102.

Specifically, if a number of the data sets in which the write number of the CQs is larger than a predetermined number (for example, 128), is larger than a predetermined number predefined in the block 70, the write number information storage unit 108 associates an error flag with the physical position in the tape medium 20a of the block 70, and stores it for each block 70. For example, if there are one or more data sets in which the write number of the CQs is larger than the predetermined number, in the block 70, the write number information storage unit 108 stores the error flag.

In addition, when the write number information storage unit 108 has an enough large storage capacity, if the write number of the CQs in the data set is larger than the predetermined number, the write number information storage unit 108 may associate the error flag with the physical position in the tape medium 20a of the data set, and store it for each data set. Moreover, when the write number information storage unit 108 has the enough large storage capacity, it may associate the write number of the CQs in the data set, with the physical position in the tape medium 20a of the data set, and store it for each data set. Moreover, in each of a plurality of blocks 70 the write number information storage unit 108 may associate the number of the data sets in which the write number of the CQs in the data set is larger than the predetermined number, with the physical position in the tape medium 20a of the block 70, and store it.

The failure determination unit 110 determines the failure in the data writing unit 102 and the failure in the tape medium 20a, based on a plurality of write number information stored in the write number information storage unit 108. FIG. 4 and FIG. 5 show an example of a failure determination method by means of the failure determination unit 110 according to this embodiment. FIG. 4(a) shows the write number information on the tape medium 20a, and FIG. 4(b) shows the write number information on the tape medium 20b. In addition, FIG. 5 shows the write number information on the tape medium 20a. It should be noted that the block filled with slash marks is the block including the data set in which the write number of the CQs is larger than the predetermined number.

As shown in FIGS. 4(a) and 4(b), in the write number information with respect to the plurality of tape media 20a and 20b to which the data has been written by the tape recording apparatus 100a, if the blocks 70 including the data set in which the write number of the CQs is larger than the predetermined number, are successive from a write starting position of the data writing unit 102 in each of the plurality of tape media 20a and 20b, along the longitudinal direction of the tape medium 20a or 20b, the failure determination unit 110 determines that there is the failure in the data writing unit 102. In other words, if there is a common write error along the longitudinal direction in the plurality of tape media 20a and 20b to which the data has been written by the tape recording apparatus 100a, it may be estimated that there is a defect in the tape recording apparatus 100a.

In addition, as shown in FIG. 5, if the write number information with respect to the tape medium 20a indicates that the blocks 70 including the data set in which the write number is larger than the predetermined number, are successive along the transverse direction of the tape medium 20a, the failure determination unit 110 determines that there is the failure in the tape medium 20a. In other words, if there are successive write errors along the transverse direction in the tape medium 20a to which the data has been written by the tape recording apparatus 110a, it is unlikely that there is the defect in the tape recording apparatus 100a, and it may be estimated that there is the defect in the tape medium 20a.

The defective area detector 112 detects the defective area of the tape of the tape medium 20a based on the write number information stored in the write number information storage unit 108. FIG. 6 shows an example of a defective area detection method by means of the defective area detector 112 according to this embodiment. The defective area detector 112 analyzes the write number information stored in the write number information storage unit 108, in sync with the writing of the data to the medium 20a by the data writing unit 102. Then as shown in FIG. 6, if blocks 70a, 70b and 70c including the data set in which the write number of the CQs is larger than the predetermined number, are successive along the transverse direction, the defective area detector 112 determines that there is the failure in the tape medium 20a along the transverse direction of the tape medium 20a, and detects that a block 70d is the defective area which exists in the above described short hand direction. Then the writing controller 114 prohibits the writing by the data writing unit 102 into the block 70d which is the defective area detected by the defective area detector 112, and controls the data writing unit 102 to write to the blocks 70 in the other area than the block 70d.

In addition, if the write number counted by the write number counter 106 reaches a preset number (for example, 192), the writing controller 114 stops the writing by the data writing unit 102 and causes the data writing unit 102 to write the same data set again in a different area from an area where the data set has been written in the tape medium 20a. Then if the write number counted by the write number counter 106 reaches the set number again, in the data set written by the data writing unit 102 again, the failure determination unit 110 determines that there is the failure in the data writing unit 102. Then the data writing unit 102 halts the writing of the data to the tape medium 20a. The communication unit 118 notifies the tape failure detection apparatus 200 that the writing has been halted. In addition, if the write number counted by the write number counter 106 does not reach the set number, in the data set written by the data writing unit 102 again, the failure determination unit 110 may determine that there is the failure in a area where the write number counted by the write number counter 106 has reached the set number, or that foreign substances such as dust and the like attach on the above described are a.

In addition, in order to analyze statistically the failure in the tape recording apparatus 100a and 100b, as well as the failure in the tape media 20a and 20b in the tape failure detection apparatus 200, the communication unit 118 reads the write number information stored in the write number information storage unit 108 based on an instruction from the tape failure detection apparatus 200, and sends it to the tape failure detection apparatus 200.

According to the tape recording apparatus 100a of this embodiment, it is possible to separate the failure in the tape recording apparatus 100a and 100b, from the failure in the tape medium 20a or 20b, based on the plurality of write number information, and to correctly identify a failure point causing the write error. In addition, if the write error is detected, it is possible to reduce a wasteful repetition of writing due to the write error and also reduce the time required to write the data, by controlling to write the data in the other area than the area where the write error has been detected. Furthermore, since it may be determined whether there is the failure in the area where the write error has been detected or there is the failure in the data writing unit 102 by causing the data to be written in the other area than the area where the write error has been detected, if the write error is detected, it is possible to identify the failure point without using the plurality of tape media 20a and 20b.

FIG. 7 shows an example of a functional configuration of the tape failure detection apparatus 200 according to this embodiment. The tape failure detection apparatus 200 includes a write number information acquisition unit 202 for acquiring the write number information from the plurality of tape recording apparatus 100a and 100b, a write number information storage unit 204 for storing the write number information acquired by write number information acquisition unit 202, a failure detector 206 for detecting the failure in at least one of the plurality of tape recording apparatus 100a and 100b and the tape media 20a and 20b, based on the write number information acquired by the write number information acquisition unit 202, and a failure notification unit 208 for notifying the plurality of tape recording apparatus 100a and 100b of the failure detected by the failure detector 206. It should be noted that since the failure detector 206 according to this example determines the failure in the tape recording apparatus 100a and 100b as well as the failure in the tape media 20a and 20b, by means of a similar determination method as the failure determination unit 110 shown in FIG. 3, the description thereof will be omitted partly.

The write number information acquisition unit 202 associates the tape medium identification information, the tape recording apparatus identification information, and the write number information in the case where the tape recording apparatus 100a or 100b identified with the tape recording apparatus identification information records the data to the tape medium 20a or 20b identified with the tape medium identification information, and acquires them from the plurality of tape recording apparatus 100a and 100b. Then the write number information storage unit 204 stores the tape medium identification information, the tape recording apparatus identification information, and the write number information acquired by the write number information acquisition unit 202. In addition, the tape failure detection apparatus 200 also may be provided with a communication interface with respect to the tape medium 20a to read the write number information directly from the cartridge memory 40 of the tape medium 20a.

The failure detector 206 detects the failure in the plurality of tape recording apparatus 100a and 100b and the tape media 20a and 20b, based on the tape medium identification information, the tape recording apparatus identification information and the write number information stored in the write number information storage unit 204.

Specifically, if the write number information with respect to each of more than one of the tape media 20a and 20b, recorded by one tape recording apparatus 100a, indicates that the blocks including the data set, in which the write number is larger than the predetermined number, are successive from the write starting position in each of the more than one of tape media 20a and 20b, along the longitudinal direction of each of the tape media 20a and 20b, the failure detector 206 detects that there is the failure in the one tape recording apparatus 100a. Moreover, if each of more than one of the write number information with respect to one tape medium 20a, recorded respectively by more than one of the tape recording apparatus 100a and 100b, indicates that the blocks 70 including the data set, in which the write number is larger than the predetermined number, are successive along the transverse direction of the tape medium 20a, the failure detector 206 detects that there is the failure in the one tape medium 20a.

The failure notification unit 208 notifies the tape recording apparatus 100a of the tape recording apparatus identification information on the tape recording apparatus 100a or 100b, or the tape medium identification information on the tape medium 20a or 20b, in which the failure detector 206 has detected the failure. If the tape recording apparatus 100a receives a notification that there is the failure in the tape recording apparatus 100a, it may halt the operation of writing the data. In addition, if the tape recording apparatus 100a receives the notification that there is the failure in the tape medium 20a, it may hold the tape medium identification information on the tape medium 20a and prohibit the data writing to the tape medium 20a. Moreover, if the tape recording apparatus 100a senses that the tape medium 20a is inserted next time, it may notify the tape failure detection apparatus 200 of that.

According to the tape failure detection apparatus 200 of the embodiment, it is possible to manage totally the information on the write errors in many tape recording apparatus or the tape media used in the network, and to analyze statistically the information on many write errors. Therefore, it is possible to detect quickly and correctly the failure in the data writing due to the fault of the tape recording apparatus or the tape medium.

FIG. 8 shows an example of a hardware configuration of the tape recording apparatus 100a and an information processing apparatus 300 according to this embodiment. The tape recording apparatus 100a is provided with a tape drive 150, a CPU 152, a RAM 154, a ROM 156 and a communication interface 158, which are interconnected via a bus.

The tape drive 150 reads a program or the data from the tape medium 20a, and provides it to the ROM 156. The ROM 156 stores a boot program which is executed by a CPU 302 on start-up of the tape recording apparatus 100a, the program for operating the tape recording apparatus 100a after the start-up or the like. Then the CPU 152 executes these programs by means of the RAM 154.

The programs provided to the tape recording apparatus 100a are read from the tape medium 20a by the tape drive 150, and installed into the tape recording apparatus 100a. Instead of that, the communication interface 158 may acquire the programs from the information processing apparatus 300 via an input/output device such as a serial port and the like or the network, and install them into the tape recording apparatus 100a.

The information processing apparatus 300 is provided with a CPU peripheral unit having the CPU 302 and a RAM 306 which are interconnected via a host controller 304; a communication interface 308, a hard disk drive 312 and an input/output unit having a CD-ROM drive 314, which are connected to the host controller 304 via an input/output controller 310; and a ROM 316, a flexible disk drive 320 and a legacy input/output unit having an input/output chip 318, which are connected to the input/output controller 310.

The host controller 304 connects the CPU 302 which access the RAM 306 at a high transfer rate to the RAM 306. The CPU 302 operates based on the programs stored in the ROM 316 and the RAM 306 to control the respective units.

The input/output controller 310 connects the communication interface 308 which is a relatively fast input/output device, the hard disk drive 312 and the CD-ROM drive 314 to the host controller 304. The communication interface 308 communicates with external apparatus such as the tape recording apparatus 100a and the like via the network. The hard disk drive 312 stores the program and the data to be used by the tape recording apparatus 100a. The CD-ROM drive 314 reads the program or the data from a CD-ROM 322, and provides them to the tape recording apparatus 100a via the communication interface 308.

In addition, the input/output controller 310 is connected with the flexible disk drive 320, the input/output chip 318 or the like which are relatively slow input/output devices, and the ROM 316. The ROM 316 stores the boot program which is executed by the CPU 302 on the start-up of the tape recording apparatus 100a, the program which depends on hardware of the tape recording apparatus 100a or the like. The flexible disk drive 320 reads the program or the data from a flexible disk 324, and provides it to the input/output chip 318 via the RAM 306. The input/output chip 318 connects the flexible disk 324, or various kinds of input/output devices, for example, via a parallel port, the serial port, a keyboard port, a mouse port or the like.

The programs provided to the tape recording apparatus 100a are stored in the recording media such as the tape medium 20a, the flexible disk 324, the CD-ROM 322, an IC card or the like, and provided by a user. The programs are read from the recording media, installed in the tape recording apparatus 100a via the communication interface 308, and executed in the tape recording apparatus 100a.

The programs to be installed and executed in the tape recording apparatus 100a include a data writing module, an error detection module, a write number counting module, a write number information storage module, a failure determination module, a defective area detection module, a writing control module, a write number information input/output module and a communication module. Since the operation which each module encourages and causes the tape recording apparatus 100a to execute, is identical with the operation of a corresponding member in the tape recording apparatus 100a as described above in FIGS. 1 to 7, the description thereof will be omitted.

The programs or the modules as described above may be stored in an external recording medium. As the recording medium, in addition to the flexible disk 324 and the CD-ROM 322, it is possible to use an optical recording medium such as a DVD or a PD, a magneto-optic recording medium such as a MD, the tape medium 20a, a semiconductor memory such as the IC card, or the like. In addition, it is possible to use a storage unit, such as the hard disk or the RAM and the like, provided in a server system connected to a dedicated communication network or the Internet, as a program recording medium, and provide the programs to the tape recording apparatus 100a via the network.

Though the present invention has been described by means of the embodiment, a technical scope of the present invention is not limited to the scope described in the above described embodiment. Various modifications or improvements may be added to the above described embodiment. It will be apparent from the description of the claims that forms with such modifications or improvements added may be included in the technical scope of the present invention.

According to the embodiment as described above, it is possible to realize a tape recording apparatus, a tape failure detection system, a tape failure detection method, a program and a recording medium as will be described in the following respective items.

A tape recording apparatus for recording data on a tape medium, will comprise: a data writing unit for writing a data unit which is a write unit of the data, to the tape medium, and if an error is detected in the writing of the data unit, writing the same data unit to the tape medium again and recording a plurality of the data units sequentially; a write number counter for, in a data set including the plurality of data units, counting a write number which is a number of writing the data units by the data writing unit; a write number information storage unit for storing write number information, in which information indicating the write number counted by the write number counter and a physical position in the tape medium of a block including a plurality of the data sets are associated with each other, with respect to a plurality of the tape media to which the above described tape recording apparatus has written; and a failure determination unit for determining that there is a failure in the data writing unit, if each of a plurality of the write number information with respect to each of the plurality of tape media indicates that the blocks including the data set, in which the write number is larger than a predetermined number, are successive from a write starting position in each of the plurality of tape media, along a longitudinal direction of each of the tape media.

The tape recording apparatus described above may further comprise a failure determination unit determines that there is the failure in the tape medium, if the write number information with respect to the tape medium indicates that the blocks including the data set, in which the write number is larger than the predetermined number, are successive along a transverse direction of the tape medium.

In the tape recording apparatus described above, wherein the write number information storage unit may associate, in each of a plurality of the blocks, a number of the data sets in which the write number is larger than the predetermined number, with the physical position of the block, and stores it.

The tape recording apparatus described above, if a number of the data sets in which the write number is larger than the predetermined number, is larger than a predetermined number in the block, the write number information storage unit associates an error flag with the physical position of the block and stores it.

In the tape recording apparatus described above, wherein if the write number in the data set is larger than the predetermined number, the write number information storage unit associates an error flag with the physical position of the data set in the tape medium and stores it.

The tape recording apparatus according to described above, further comprise a write number information input unit for reading the write number information on the tape medium stored in a memory which the tape medium has, from the memory, wherein the write number information storage unit associates the write number information read by the write number information input unit, with identification information on the tape medium, and stores it.

A tape recording apparatus for recording data on a tape medium, will comprise: a data writing unit for writing a data unit which is a write unit of the data, to the tape medium, and if an error is detected in the writing of the data unit, writing the same data unit to the tape medium again and recording a plurality of the data units sequentially; a write number counter for, in a data set including the plurality of data units, counting a write number which is a number of writing the data units by the data writing unit; a write number information storage unit for storing write number information, in which information indicating the write number counted by the write number counter and a physical position in the tape medium of a block including a plurality of the data sets are associated with each other; a defective area detector for detecting a defective area of a tape of the tape medium based on the write number information stored in the write number information storage unit; and a writing controller for prohibiting the writing by the data writing unit into the defective area detected by the defective area detector, and controlling the data writing unit to write in the other area than the defective area.

A tape recording apparatus for recording data on a tape medium, will comprise: a data writing unit for writing a data unit which is a write unit of the data, to the tape medium, and if an error is detected in the writing of the data unit, writing the same data unit to the tape medium again and recording a plurality of the data units sequentially; a write number counter for, in a data set including the plurality of data units, counting a write number which is a number of writing the data units by the data writing unit; a writing controller for, if the write number counted by the write number counter reaches a set number, causing the writing by the data writing unit to stop and causing the data writing unit to write the data set again in a different area from an area where the data set has been written in the tape medium; and a failure determination unit for determining that there is a failure in the data writing unit, if the write number counted by the write number counter reaches the set number, in the data set written by the data writing unit again.

A tape failure detection system for detecting a failure in a tape medium or a tape recording apparatus, will comprise: a plurality of tape recording apparatus for recording data to the tape medium; and a tape failure detection apparatus connected to the plurality of tape recording apparatus, wherein the tape recording apparatus includes: a data writing unit for writing a data unit which is a write unit of the data, to the tape medium, and if an error is detected in the writing of the data unit, writing the same data unit to the tape medium again and recording a plurality of the data units sequentially; a write number counter for, in a data set including the plurality of data units, counting a write number which is a number of writing the data units by the data writing unit; and a write number information storage unit for storing write number information, in which information indicating the write number counted by the write number counter and a physical position in the tape medium of a block including a plurality of the data sets are associated with each other, and wherein the tape failure detection apparatus includes: a write number information acquisition unit for associating tape medium identification information which is information for identifying the tape medium, tape recording apparatus identification information which is information for identifying the tape recording apparatus, and the write number information in the case where the tape recording apparatus identified with the tape recording apparatus identification information records the data to the tape medium identified with the tape medium identification information, and acquiring them from the plurality of tape recording apparatus; and a failure detector for detecting the failure in at least one of the plurality of tape recording apparatus and the tape medium, based on the tape medium identification information, the tape recording apparatus identification information and the write number information acquired by the write number information acquisition unit.

In the tape failure detection system according to described above, wherein if the write number information with respect to each of more than one of the tape media, recorded by one of the tape recording apparatus, indicates that the blocks including the data set, in which the write number is larger than a predetermined number, are successive from a write starting position in each of the more than one of tape media, along a longitudinal direction of each of the tape media, the failure detector detects that there is the failure in the one of the tape recording apparatus.

In the tape failure detection system according to described above, if each of more than one of the write number information with respect to one of the tape media, recorded respectively by more than one of the tape recording apparatus, indicates that the blocks including the data set, in which the write number is larger than a predetermined number, are successive along a transverse direction of the one of the tape media, the failure detector detects that there is the failure in the one of the tape media.

In a tape recording apparatus for recording data on a tape medium, a tape failure detection method for detecting a failure in the tape medium or the tape recording apparatus, comprises: a data writing step for writing a data unit which is a write unit of the data, to the tape medium, and if an error is detected in the writing of the data unit, writing the same data unit to the tape medium again and recording a plurality of the data units sequentially; a write number counting step for, in a data set including the plurality of data units, counting a write number which is a number of writing the data units in the data writing step; a write number information storage step for storing write number information, in which information indicating the write number counted in the write number counting step and a physical position in the tape medium of a block including a plurality of the data sets are associated with each other, with respect to a plurality of the tape media to which the above described tape recording apparatus has written; and a failure determination step for determining that there is a failure in the above described tape recording apparatus, if each of a plurality of the write number information with respect to each of the plurality of tape media indicates that the blocks including the data set, in which the write number is larger than a predetermined number, are successive from a write starting position in each of the plurality of tape media, along a longitudinal direction of each of the tape media.

In a tape recording apparatus for recording data on a tape medium, a tape failure detection method for detecting a failure in the tape medium or the tape recording apparatus, comprises: a data writing step for writing a data unit which is a write unit of the data, to the tape medium, and if an error is detected in the writing of the data unit, writing the same data unit to the tape medium again and recording a plurality of the data units sequentially; a write number counting step for, in a data set including the plurality of data units, counting a write number which is a number of writing the data units in the data writing step; a write number information storage step for storing write number information, in which information indicating the write number counted in the write number counting step and a physical position in the tape medium of a block including a plurality of the data sets are associated with each other; a defective area detection step for detecting a defective area of a tape of the tape medium based on the write number information stored in the write number information storage step; and a writing control step for prohibiting the writing of the data into the defective area detected in the defective area detection step, and controlling to write in the other area than the defective area.

In a tape recording apparatus for recording data on a tape medium, a tape failure detection method for detecting a failure in the tape medium or the tape recording apparatus, comprises: a data writing step for writing a data unit which is a write unit of the data, to the tape medium, and if an error is detected in the writing of the data unit, writing the same data unit to the tape medium again and recording a plurality of the data units sequentially; a write number counting step for, in a data set including the plurality of data units, counting a write number which is a number of writing the data units in the data writing step; a writing control step for, if the write number counted in the write number counting step reaches a set number, causing the writing of the data to stop and causing the data set to be written again in a different area from an area where the data set has been written in the tape medium; and a failure determination step for determining that there is a failure in the above described tape recording apparatus, if the write number reaches the set number, in the data set written in the writing control step again.

A program for a tape recording apparatus for recording data on a tape medium comprises the program allowing the tape recording apparatus to function as: a data writing unit for writing a data unit which is a write unit of the data, to the tape medium, and if an error is detected in the writing of the data unit, writing the same data unit to the tape medium again and recording a plurality of the data units sequentially; a write number counter for, in a data set including the plurality of data units, counting a write number which is a number of writing the data units by the data writing unit; a write number information storage unit for storing write number information, in which information indicating the write number counted by the write number counter and a physical position in the tape medium of a block including a plurality of the data sets are associated with each other, with respect to a plurality of the tape media to which the above described tape recording apparatus has written; and a failure determination unit for determining that there is a failure in the data writing unit, if each of a plurality of the write number information with respect to each of the plurality of tape media indicates that the blocks including the data set, in which the write number is larger than a predetermined number, are successive from a write starting position in each of the plurality of tape media, along a longitudinal direction of each of the tape media.

A program for a tape recording apparatus for recording data on a tape medium, comprises the program allowing the tape recording apparatus to function as: a data writing unit for writing a data unit which is a write unit of the data, to the tape medium, and if an error is detected in the writing of the data unit, writing the same data unit to the tape medium again and recording a plurality of the data units sequentially; a write number counter for, in a data set including the plurality of data units, counting a write number which is a number of writing the data units by the data writing unit; a write number information storage unit for storing write number information, in which information indicating the write number counted by the write number counter and a physical position in the tape medium of a block including a plurality of the data sets are associated with each other; a defective area detector for detecting a defective area of a tape of the tape medium based on the write number information stored in the write number information storage unit; and a writing controller for prohibiting the writing by the data writing unit into the defective area detected by the defective area detector, and controlling the data writing unit to write in the other area than the defective area.

A program for a tape recording apparatus for recording data on a tape medium comprises the program allowing the tape recording apparatus to function as: a data writing unit for writing a data unit which is a write unit of the data, to the tape medium, and if an error is detected in the writing of the data unit, writing the same data unit to the tape medium again and recording a plurality of the data units sequentially; a write number counter for, in a data set including the plurality of data units, counting a write number which is a number of writing the data units by the data writing unit; a writing controller for, if the write number counted by the write number counter reaches a set number, causing the writing by the data writing unit to stop and causing the data writing unit to write the data set again in a different area from an area where the data set has been written in the tape medium; and a failure determination unit for determining that there is a failure in the data writing unit, if the write number counted by the write number counter reaches the set number, in the data set written by the data writing unit again.

As is apparent from the above description, according to the present invention, it is possible to separate the failure in the tape recording apparatus from the failure in the tape medium to correctly identify the failure point causing the write error.

While in invention has been particularly shown as described with reference to a preferred embodiment, it will be understood by those skilled in the art that various changes in form and detail may be made therein without departing from the spirit and scope of the invention. It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communication links.

What is claimed is:

1. An apparatus for detecting errors in recording data on a tape medium, said apparatus comprising:
    a data-writing unit for writing data units to one or more tape media, and in response to an error being detected when writing data units to one or more tape media, rewriting said data units to said tape media in a rewrite operation;
    a write number counter for counting a number of said rewrite operations performed by said data writing unit for a single data unit;
    a failure determination unit that determines that a failure has occurred for writing said single data unit if said number of rewrite operations exceeds a pre-determined number;
    an error locating unit that stores each location of said rewrites associated with said failure with respect to said single data unit;
    means for determining, by statistically analyzing said locations of said writes associated with said errors as stored in said error locating unit, whether said error is an error due to a failure of a writing head or to a fault of said tape medium, wherein said means for determining determines that if said locations associated with said errors are situated along a track of said tape medium, said errors are due to said failure of said writing head, and otherwise determines that said errors are due to said fault of said tape medium; and
    a defective area detector for detecting a physically-defined defective area of said tape medium by statistically analyzing said locations of said writes associated with said failures as stored in said error locating unit, wherein said means for determining by statistically analyzing comprises means for comparing a write number to a threshold maximum.

2. The tape recording apparatus according to claim 1, wherein said failure determination unit further comprises means for determining that a failure exists in said tape medium, in response to said number of rewrite operations exceeding said pre-determined number when measured along a transverse direction of said tape medium.

3. The tape recording apparatus according to claim 1, wherein said failure determination unit further comprises means for determining that a failure exists in said data-writing unit, in response to said number of rewrite operations exceeding said pre-determined number when measured along a longitudinal direction of said tape medium.

4. The tape recording apparatus according to claim 1, wherein said error locating unit further comprises means for storing a number of said single data units with respect to which said failures exist and said locations of said single data units.

5. The tape recording apparatus according to claim 1, further comprising:
    a write number input output unit for reading or writing error information to a cartridge memory;
    a writing controller for controlling said data writing unit;
    a write number information storage unit;
    a communication unit for communicating through a network; and
    an error detector for detecting write errors.

6. The tape recording apparatus according to claim 1, wherein said error locating unit further comprises means for associating an error flag with content of said single data unit.

7. The tape recording apparatus according to claim 1, further comprising a write number information input unit for reading said number of rewrite operations from a memory within said tape medium, such that said error locating unit can selectably associate said number of rewrites with said location of said rewrites on said tape medium.

8. A method for detecting errors in recording data on a tape medium, said method comprising:
    writing data units to one or more tape media, and in response to an error being detected when writing data units to one or more tape media, rewriting said data units to said tape media in a rewrite operation;
    counting a number of said rewrite operations performed by said data writing unit for a single data unit;
    determining that a failure has occurred for writing said single data unit if said number of rewrite operations exceeds a pre-determined number; and
    storing each location of said rewrites associated with said failure with respect to said single data unit
    determining, by statistically analyzing said locations of said writes associated with said errors as stored in said error locating unit, whether said error is an error due to a failure of a writing head or to a fault of said tape medium, wherein said means for detemining determines that if said locations associated with said errors are situated along a track of said tape medium, said errors are due to said failure of said writing head, and otherwise determines that said errors are due to said fault of said tape medium; and
    detecting a physically-defined defective area of said tape medium by statistically analyzing said locations of said writes associated with said failures as stored in said error locating unit, wherein said statistical analyzing comprises comparing a write number to a threshold maximum.

9. The method of claim 8, wherein said determining step further comprises determining that a failure exists in said tape medium, if said number of rewrite operations exceeds said pre-determined number when said number of rewrite operations are measured along a transverse direction of said tape medium.

10. The method of claim 8, wherein said determining step further comprises determining that a failure exists in said data-writing unit, if said number of rewrite operations exceeds said pre-determined number when said number of rewrite operations are measured along a longitudinal direction of said tape medium.

11. The method of claim 8, further comprising storing a number of said single data units with respect to which said failures exist and said locations of said single data units.

12. The method of claim 8, further comprising reading or writing error information to a cartridge memory.

13. method of claim 8, further comprising associating an error flag with a content of said single data unit.

14. The method of claim 8, further comprising reading said number of rewrite operations from a memory within said tape medium, such that said error locating unit can selectably associate said number of rewrites with said location of said rewrites on said tape medium.

15. A computer program product in a computer-readable medium for detecting errors in recording data on a tape medium, said computer program product comprising:
  a computer-readable medium;
  instructions on the computer-readable medium for writing data units to one or more tape media, and in response to an error being detected when writing data units to one or more tape media, rewriting said data units to said tape media in a rewrite operation;
  instructions on the computer-readable medium for counting a number of said rewrite operations performed by said data writing unit for a single data unit;
  instructions on the computer-readable medium for determining that a failure has occurred for writing said single data unit if said number of rewrite operations exceeds a pre-determined number; and
  instructions on the computer-readable medium for storing each location of said rewrites associated with said failure with respect to said single data unit
  instructions on the computer-readable medium for determining, by statistically analyzing said locations of said writes associated with said errors as stored in said error locating unit, whether said error is an error due to a failure of a writing head or to a fault of said tape medium, wherein said means for determining determines that if said locations associated with said errors are situated along a track of said tape medium, said errors are due to said failure of said writing head, and otherwise determines that said errors are due to said fault of said tape medium; and
  instructions on the computer-readable medium for detecting a physically-defined defective area of said tape medium by statistically analyzing said locations of said writes associated with said failures as stored in said error locating unit, wherein said statistical analyzing comprises comparing a write number to a threshold maximum.

16. The computer program product of claim 15, wherein said instructions on the computer-readable medium for determining further comprise instructions for determining that a failure exists in said tape medium, when said number of rewrite operations exceeds said pre-determined number when said number of rewrite operations are measure along a transverse direction of said tape medium.

17. The computer program product of claim 15, further comprising instructions on the computer-readable medium for determining further comprise instructions for determining that a failure exists in said data-writing unit, if said number of rewrite operations exceeds said pre-determined number when said number of rewrite operations are measured along a longitudinal direction of said tape medium.

18. The computer program product of claim 15, further comprising instructions on the computer-readable medium for storing a number of said single data units with respect to which said failures exist and said locations of said single data units.

19. The computer program product of claim 15, further comprising instructions on the computer-readable medium for associating an error flag with said location of said single data unit.

20. The computer program product of claim 15, further comprising instructions on the computer-readable medium for reading said number of rewrite operations from a memory within said tape medium, such that said error locating unit can selectably associate said number of rewrites with said location of said rewrites on said tape medium.

* * * * *